United States Patent
Chiu

(10) Patent No.: US 7,857,268 B2
(45) Date of Patent: Dec. 28, 2010

(54) SUCTION-TYPE MOUNTING BRACKET DEVICE

(76) Inventor: Yan-Jie Chiu, 6F-1, No. 62, Lane 297-9, Sec. 2, Situn Rd., Situn district, Taichung City 407 (TW)

( * ) Notice: Subject to any disclaimer, the term of this patent is extended or adjusted under 35 U.S.C. 154(b) by 0 days.

(21) Appl. No.: 12/394,124

(22) Filed: Feb. 27, 2009

(65) Prior Publication Data
US 2009/0230262 A1    Sep. 17, 2009

(30) Foreign Application Priority Data
Mar. 12, 2008    (TW) .............................. 97108774 A

(51) Int. Cl.
*F16B 47/00* (2006.01)
(52) U.S. Cl. .................... 248/206.3; 248/149; 248/154; 248/177.1; 248/179.1
(58) Field of Classification Search ............. 248/206.3, 248/148, 149, 154, 163.1, 440, 440.1, 176.1, 248/177.1, 178.1, 179.1, 181.1, 183.1, 122.1, 248/187.1, 205, 5, 205.6, 205.7, 205.8, 206.1, 248/362, 363, 467, 537, 106, 121
See application file for complete search history.

(56) References Cited

U.S. PATENT DOCUMENTS

| | | | | | |
|---|---|---|---|---|---|
| 2,244,773 A | * | 6/1941 | Hawk | ......................... | 248/451 |
| 2,681,782 A | * | 6/1954 | Buichi | ........................ | 248/106 |
| 3,222,020 A | * | 12/1965 | Rea | ............................ | 248/106 |
| 3,586,278 A | * | 6/1971 | Simons | ...................... | 248/165 |
| 4,241,988 A | * | 12/1980 | Lepp | ............................ | 396/4 |
| 5,092,549 A | * | 3/1992 | Beech | ........................ | 248/103 |
| 5,246,193 A | * | 9/1993 | Faidley | .................... | 248/206.3 |
| 5,820,116 A | * | 10/1998 | Haese | ......................... | 269/21 |
| 7,021,593 B1 | * | 4/2006 | Fan | ........................... | 248/206.2 |
| 7,210,805 B1 | * | 5/2007 | Jacobs | ........................ | 359/872 |
| 7,347,018 B2 | * | 3/2008 | Haggard, Jr. | ................. | 40/604 |

\* cited by examiner

*Primary Examiner*—Anita M King
(74) *Attorney, Agent, or Firm*—Wang Law Firm; Li K. Wang

(57) ABSTRACT

A suction-type mounting bracket device for use with a portable electronic device includes a crossbar, an adjustable mount, at least two support posts, at least two suction cups, and a control lever. The adjustable mount is slidably provided on the crossbar for the portable electronic device to connect thereto. The support posts each have a first end connected to connecting sections provided on the crossbar and a second end connected to the suction cups. The control lever is connected to the suction cups for controlling the suction cups to attach to or release from a smooth surface. With these arrangements, the portable electronic device may be stably and firmly mounted in a car via the suction-type mounting bracket device and may be adjusted to different angular positions for use.

13 Claims, 5 Drawing Sheets

SUCTION-TYPE MOUNTING BRACKET DEVICE

FIELD OF THE INVENTION

The present invention relates to a suction-type mounting bracket device, and more particularly to a suction-type mounting bracket device having a plurality of suction cups capable of stably holding a portable electronic device to a smooth surface for operating in a normal position.

BACKGROUND OF THE INVENTION

With the fast development in various technological fields, people pay more attention to healthy outdoor activities, including traveling and making a trip. When traveling or making a trip by driving, people would usually position one or more desired portable electronic devices in the car, such as a still camera, a video camera, a global positioning system (GPS) navigator, a personal digital assistant (PDA), etc., so that the driver may timely and accurately take pictures or quickly and correctly find and reach the destination with the help of these portable electronic devices. Moreover, with the video camera or the still camera mounted in the car, pictures may be timely taken during driving and used as an evidencing record to support the driver in the event of an accident. With the support of such evidencing record, the party that should be responsible for the accident may be immediately and clearly determined without the necessity of stopping the cars on the road and waiting for the traffic police. A lot of traffic jams and disputes between the drivers involved in less serious accidents may therefore be avoided.

On the other hand, with the upgraded network wideband specifications and techniques as well as the new trends of multimedia networks, more and more people love to post the pictures and clips they shot in their blogs. Therefore, even an amateur photography lover may take pictures using a still camera or a video camera on a car to record the beautiful scenery during travel or trip, and share the pictures or films with others over the Internet.

To use a portable electronic device in a car, the user may hold the device with two hands or position the device on a planar surface by providing a stand behind the device. However, the stand can only support the device without the function of fixedly holding the device in place. The expensive portable electronic device rested on the stand is subject to unexpected movement and falling, and accordingly undesirable damage. Due to the limited space available in a car, the stand for the portable electronic device is usually positioned atop the dashboard and can not be freely adjusted to different angular positions for the driver and other passengers to clearly view the information displayed on the device from the most comfortable angle.

A suction-type mounting bracket device for use with a portable electronic device has been developed, so that the portable electronic device used in a car may be attached to the windshield, for example, via the suction-type mounting bracket device. The conventional suction-type mounting bracket device has only one suction cup with a rubber flange portion for attaching to the windshield. In the event the suction cup is loosened from the windshield, the whole portable electronic device will fall and become damaged. Moreover, with the conventional suction-type mounting bracket device, the portable electronic device connected thereto is usually in an inverted position, preventing the user to handle or operate it in a normal position. And, the user has to use complicated and troublesome computer programs to reverse the images taken by the inverted portable electronic device when playing back the images for viewing at a later time.

It is therefore tried by the inventor to develop an improved suction-type mounting bracket device for use with a portable electronic device to overcome the above-mentioned drawbacks.

SUMMARY OF THE INVENTION

A primary object of the present invention is to provide a suction-type mounting bracket device having a rotatable crossbar, so that a portable electronic device mounted on the crossbar may be adjusted to a position allowing a user to operate the portable electronic device in a normal manner.

Another object of the present invention is to provide a suction-type mounting bracket device which has at least two suction cups with a rubber flange portion each for attaching to a smooth surface through suction force, such that even if any one of the rubber flange portions of the suction cups is loosened from the smooth surface, the rubber flange portion or portions of the remaining suction cup or cups may still provide sufficient supporting capability to support a portable electronic device connected to the suction-type mounting bracket device, protecting the portable electronic device against falling and any damage so caused. And, with two suction cups, the suction-type mounting bracket device is able to support a relatively heavy portable electronic device thereon while being attached to the smooth surface through suction force.

To achieve the above and other objects, the suction-type mounting bracket device according to the present invention is applicable to a portable electronic device and includes a crossbar, an adjustable mount, at least two support posts, at least two suction cups, a plurality of stoppers, and a control lever. The adjustable mount includes a pivoted body, to which the portable electronic device may be connected, and an inverted-T connector connected to the pivoted body and slidably received in a slot provided on the crossbar, such that the adjustable mount is movable on the crossbar along the slot, and the portable electronic device may be adjusted to different angular positions via the pivoted body.

The support posts each have a first end connected to connecting sections provided on the crossbar and a second end connected to the suction cups. The crossbar may be rotated about the first ends of the support posts. The control lever is connected to the suction cups for controlling the suction cups to attach to or release from a smooth surface.

With these arrangements, the portable electronic device may be stably and firmly mounted to a desired position via the suction-type mounting bracket device and may be adjusted to different angular positions for use in an optimal manner.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
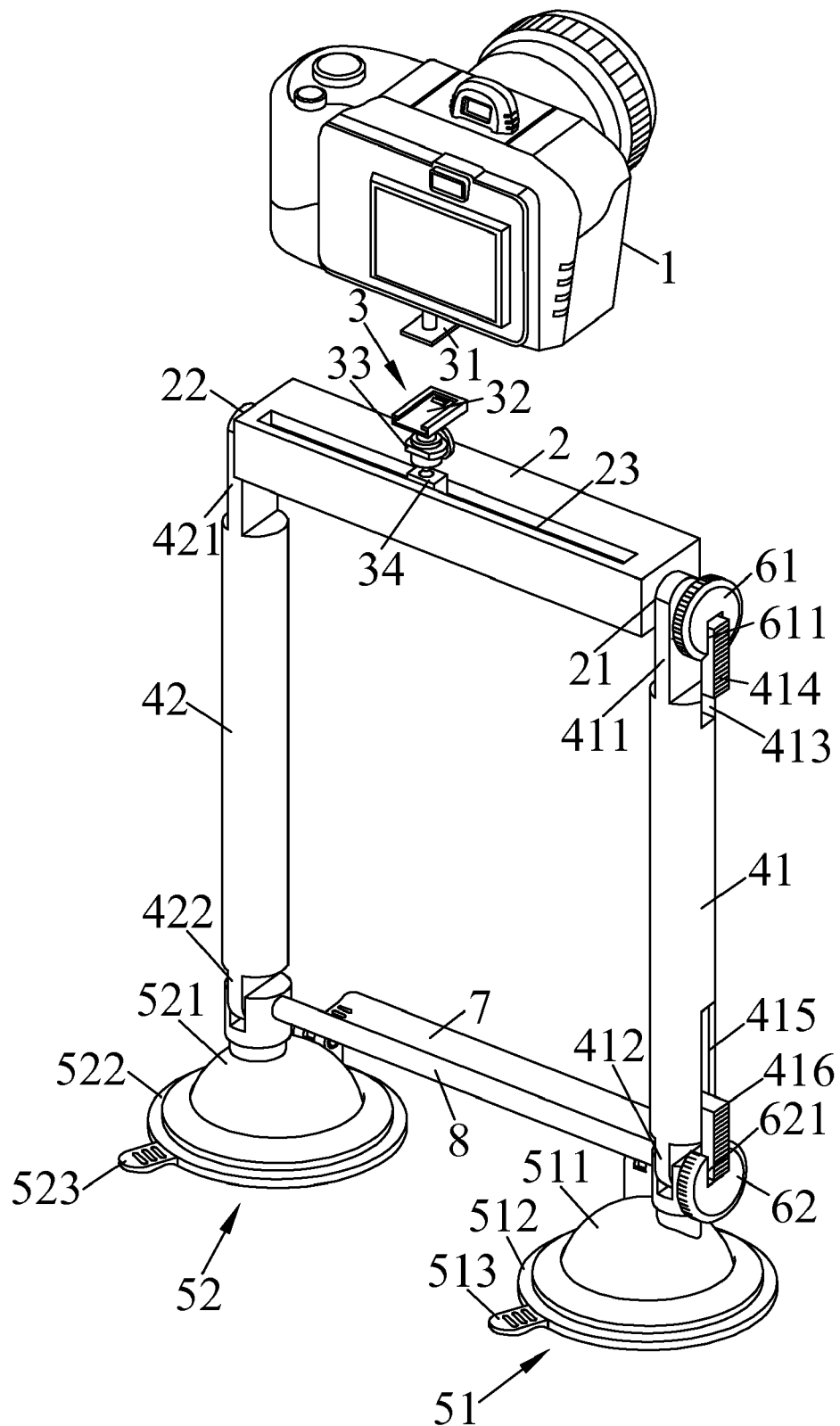
FIG. 1 is an assembled perspective view of a suction-type mounting bracket device according to a first preferred embodiment of the present invention.

The present invention will now be described with some preferred embodiments thereof. For the purpose of ease of understanding, elements that are the same in the preferred embodiments are denoted by the same reference numerals.

Figure 2:
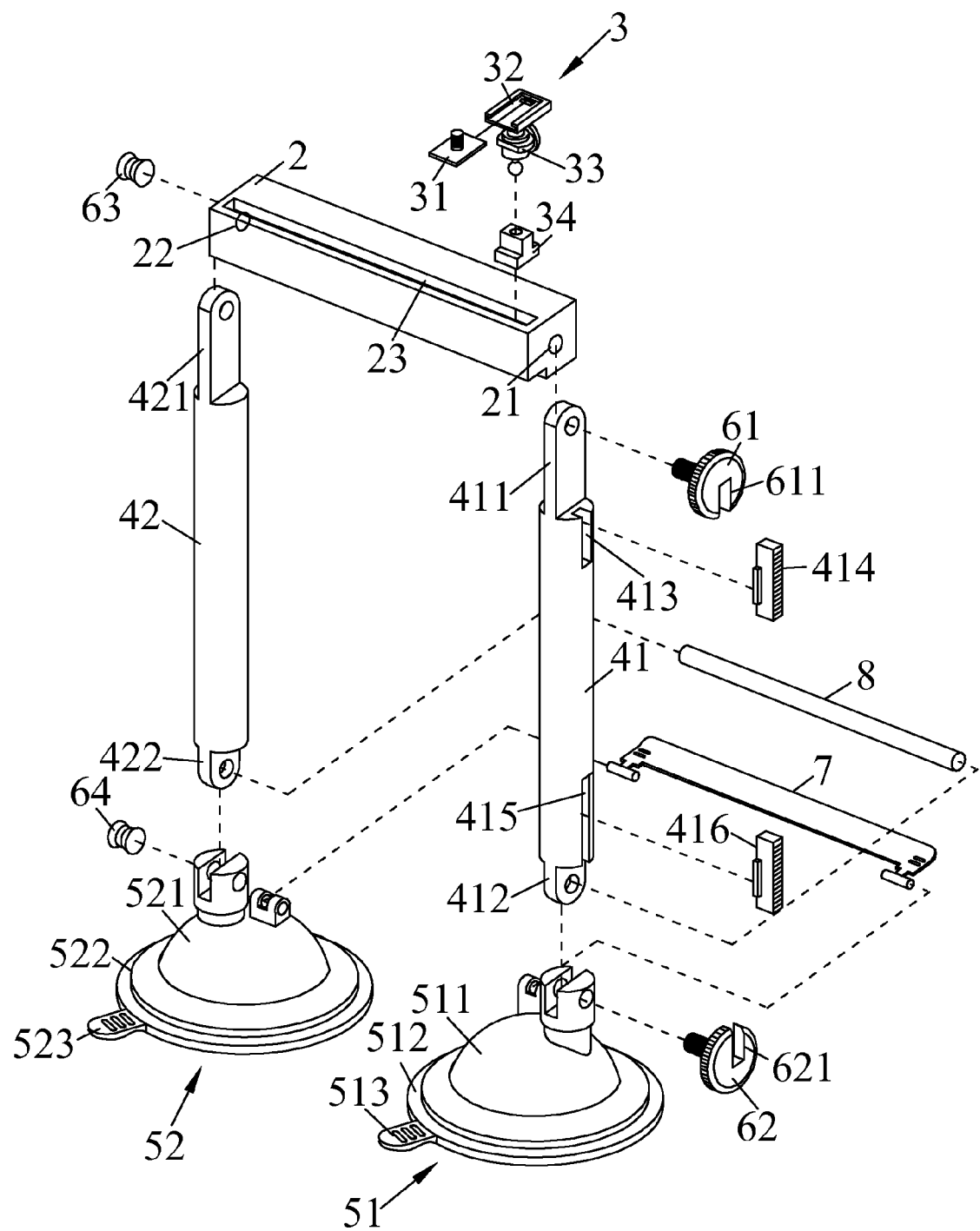
FIG. 2 is an exploded perspective view of the suction-type mounting bracket device of FIG. 1.

Please refer to FIGS. 1 and 2 concurrently. FIGS. 1 and 2 are assembled and exploded perspective views, respectively, of a suction-type mounting bracket device according to a first preferred embodiment of the present invention suitable for holding a portable electronic device 1 in place. As shown, the suction-type mounting bracket device includes a crossbar 2, an adjustable mount 3, a first support post 41, a second support post 42, a first suction cup 51, a second suction cup 52, a plurality of stoppers, a control lever 7, and a brace 8.

The crossbar 2 has a first connecting section 21, a second connecting section 22, and a slot 23. The first connecting section 21 and the second connecting section 22 are connected to first ends 411, 421 of the first and the second support post 41, 42, respectively. The slot 23 is provided for slidably receiving an end of the adjustable mount 3 therein, so that the adjustable mount 3 is connected to and movable along the crossbar 2. The first and the second connecting section 21, 22 may be, for example, a recess each, depending on actual need in design.

The adjustable mount 3 is mounted on the crossbar 2 for the portable electronic device 1 to connect thereto. The adjustable mount 3 includes a male connector 31, a mating female connector 32, a pivoted body 33, and an inverted-T connector 34. The male connector 31 has an upper portion detachably connected to the portable electronic device 1, and a lower portion removably connected to the top of the female connector 32. The female connector 32 has a bottom connected to an upper end of the pivoted body 33, while the pivoted body 33 has a lower end connected to a head of the inverted-T connector 34. The pivoted body 33 allows adjustment of the portable electronic device 1 to different angular positions relative to the suction-type mounting bracket device of the present invention.

The first and the second support post 41, 42 each has a first end 411, 421, which are respectively connected to the first and the second connecting section 21, 22 of the crossbar 2, and a second end 412, 422 for connecting to the first and the second suction cup 51, 52, respectively. The first support post 41 is provided on one outer side with a first channel 413, a first lock piece 414, a second channel 415, and a second lock piece 416. The first lock piece 414 is slidably mounted to the first channel 413, and the second lock piece 416 is slidably mounted to the second channel 415. The lock pieces 414, 416 serve to fixedly lock the stoppers in place, as will be described in more details herein.

The first and the second suction cup 51, 52 are connected to the second end 412, 422 of the first and the second support post 41, 42, respectively. The first suction cup 51 includes a cup portion 511, a rubber flange portion 512, and a first pull tab 513. The second suction cup 52 includes a cup portion 521, a rubber flange portion 522, and a second pull tab 523. The cup portions 511, 521 are located atop the rubber flange portions 512, 522, respectively, and the first and the second pull tab 513, 523 are located at and projected from a rim of the rubber flange portions 512, 522, respectively.

The plurality of stoppers are used to lock the first support post 41 to the crossbar 2, the second support post 42 to the crossbar 2, the first support post 41 to the first suction cup 51, and the second support post 42 to the second suction cup 52.

In the illustrated preferred embodiment, the stoppers include bolts 61, 62 and rivets 63, 64. As can be seen from FIGS. 1 and 2, the bolts 61, 62 each are provided with a notch 611, 621, with which the first and the second lock piece 414, 416 may be releasably engaged. The rivet 63 connects the second support post 42 to the second connecting section 22 of the crossbar 2, and the rivet 64 connects the second support post 42 to the second suction cup 52.

Figure 3:
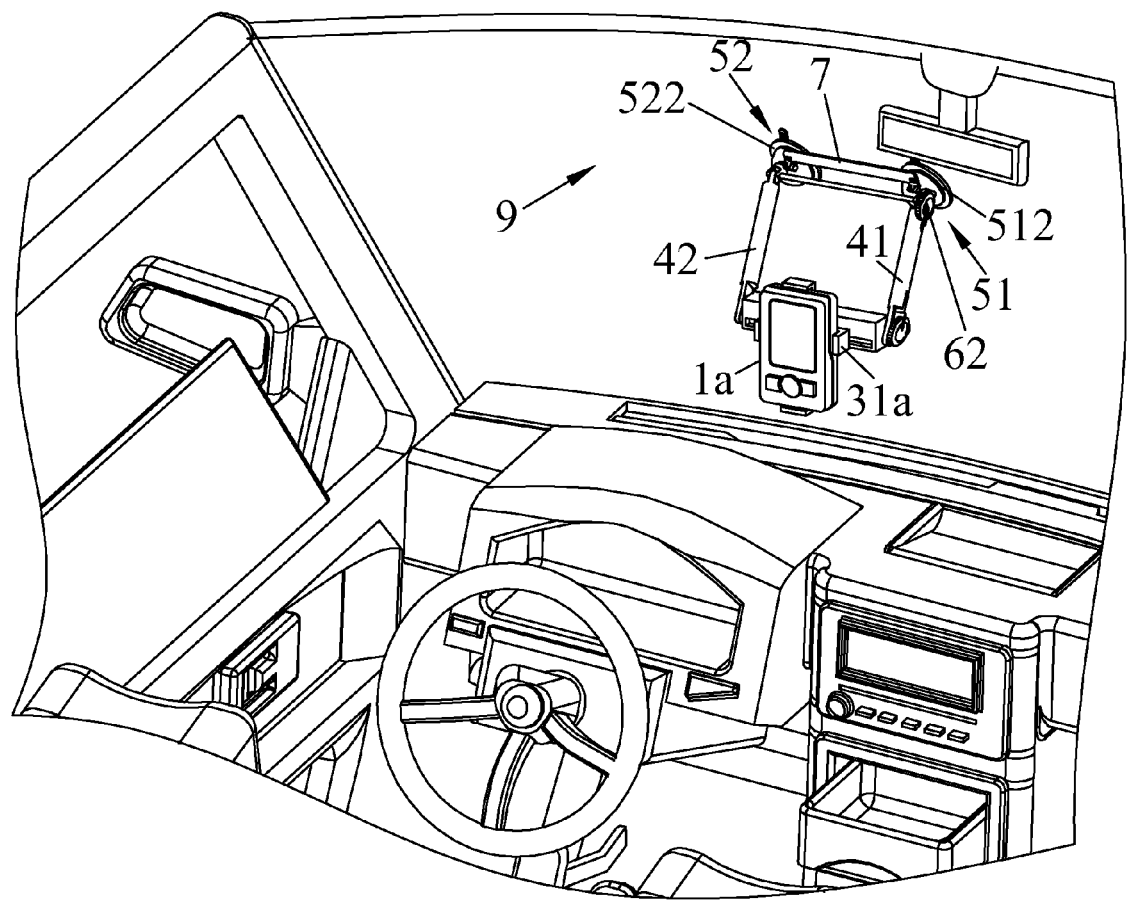
FIG. 3 shows an example of using the suction-type mounting bracket device according to the first preferred embodiment of the present invention in a car.

The control lever 7 is connected to the cup portions 511, 521 of the first and the second suction cup 51, 52 for controlling the first and the second suction cup 51, 52 to suck to or release from a glass member 9, such as a car windshield, as shown in FIG. 3.

The brace 8 is connected at two opposite ends to the first and second suction cups 51, 52. The brace 8 serves to strengthen and hold the first and the second support post 41, 42 in place, so that the whole suction-type mounting bracket device does not become deformed.

FIG. 3 shows an example of using the suction-type mounting bracket device according to the first preferred embodiment of the present invention in a car. As shown, to use the present invention in a car, a user first connects a portable electronic device 1a to a matching male connector 31a of the suction-type mounting bracket device. The portable electronic device 1a may be any one of, for example, a video camera, a still camera, a personal digital assistant (PDA), a global positioning system (GPS) navigator, a speedometer, a digital television, or a mobile phone. In FIG. 3, the illustrated portable electronic device 1a is a PDA. Then, the user may attach the rubber flange portions 512, 522 of the first and second suction cups 51, 52 to the windshield, which is a glass member 9, and pushes the control lever 7 downward to create an airtight environment with negative pressure within the rubber flange portions 512, 522, so that the suction cups 51, 52 are tightly attached to the windshield. Even if any one of the rubber flange portions 512, 522 of the first and second suction cups 51, 52 is undesirably loosened from the windshield, the other one of the rubber flange portions 512, 522 may still bear the weight of the portable electronic device 1a, preventing the portable electronic device 1a from falling suddenly to cause any damage thereto.

Figure 4:
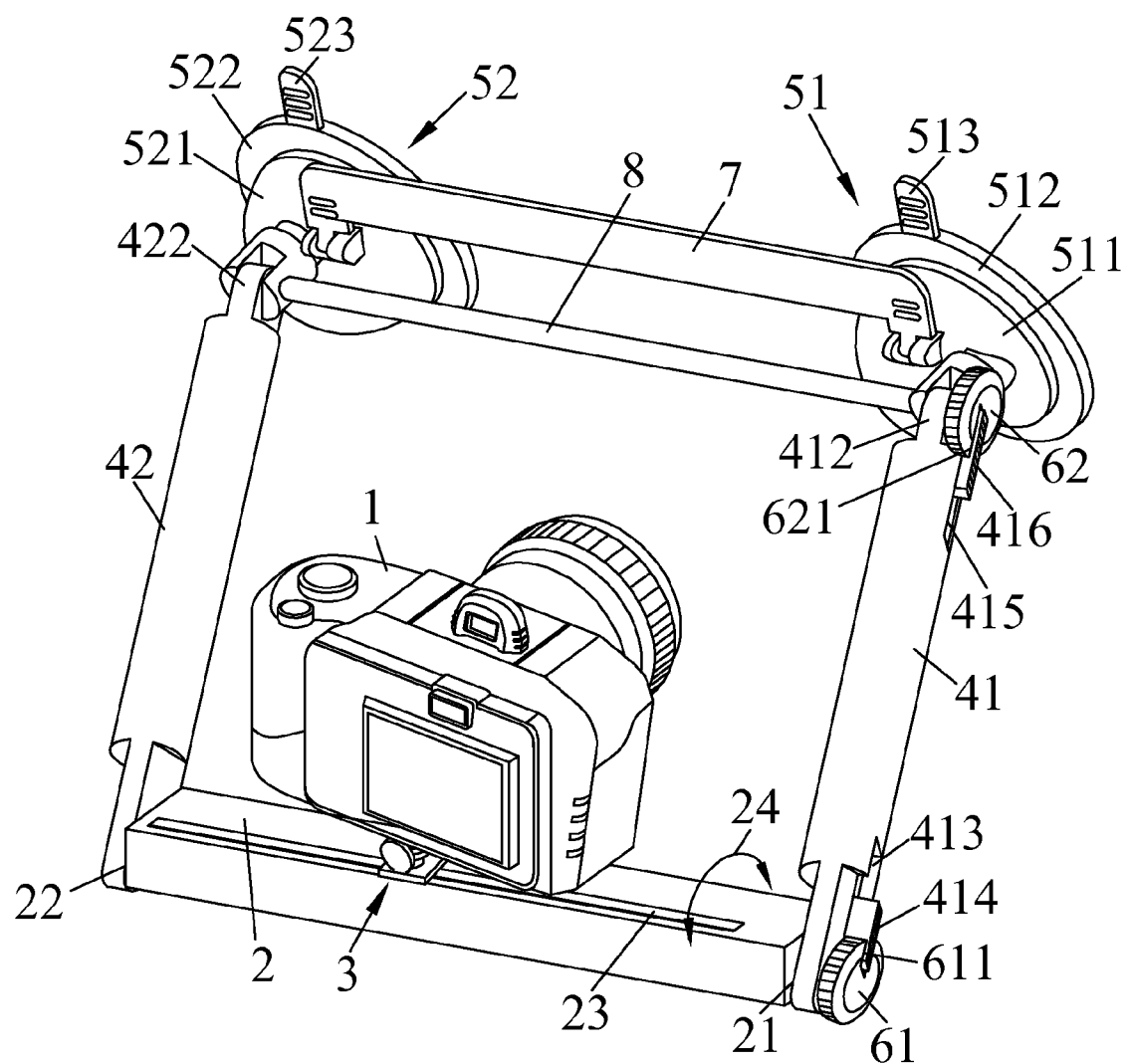
FIG. 4 is a perspective view showing another example of using the suction-type mounting bracket device according to the first preferred embodiment of the present invention.

FIG. 4 is a perspective view showing another example of using the suction-type mounting bracket device according to the first preferred embodiment of the present invention. As shown, to avoid the portable electronic device 1 from contacting with the glass member 9, such as a windshield (not shown in FIG. 4), the second bolt 62 may be tightened after the first support post 41 has been adjusted to a desirable angular position relative to the glass member 9. And, the crossbar 2 may be adjusted to orient the slot 23 toward a desired direction through a rotating motion 24 about the first ends 411, 421 of the first and second support posts 41, 42 before the first bolt 61 is tightened against the first connecting section 21 of the crossbar 2. For example, in the illustrated FIG. 4, the crossbar 2 has been rotated for the portable electronic device 1 connected to the slot 23 via the adjustable mount 3 to move from an upside down position to an optimal position for the user to operate it in a normal way. Further, with the pivoted body 33, the portable electronic device 1 may be pivotally adjusted to an angular position most suitable for the user to view it. With the portable electronic device 1 being adjusted to the best viewing angle and operational position, the user needs not to troublesomely use a complicated computer program to reverse the upside-down images shot by the portable electronic device 1 when the user desires to watch the images on the screen of the portable electronic device 1 at a later time.

Thereafter, when the crossbar 2 has been adjusted to the desired orientation, the user may slide the first and the second lock piece 414, 416 into the notches 611, 621, respectively, so that the bolts 61, 62 are fixedly locked in place on the first support post 41 by the lock pieces 414, 416 without the risk of becoming loosened from the crossbar 2 and the first support post 41 due to vibration of the car during driving. After the lock pieces 414, 416 have been engaged with the notches 611, 621, respectively, the mounting of the suction-type mounting bracket device and accordingly, the portable electronic device 1 to the glass member 9 is completed.

When it is desired to dismount the suction-type mounting bracket device from the glass member 9, the user first pulls the control lever 7 upward to release the airtight environment with negative pressure in the suction cups 51, 52, and then pulls the first and the second pull tab 513, 523 to admit ambient air between the glass member 9 and the rubber flange portions 512, 522. At this point, the suction-type mounting bracket device may be easily removed from the glass member 9.

Figure 5:
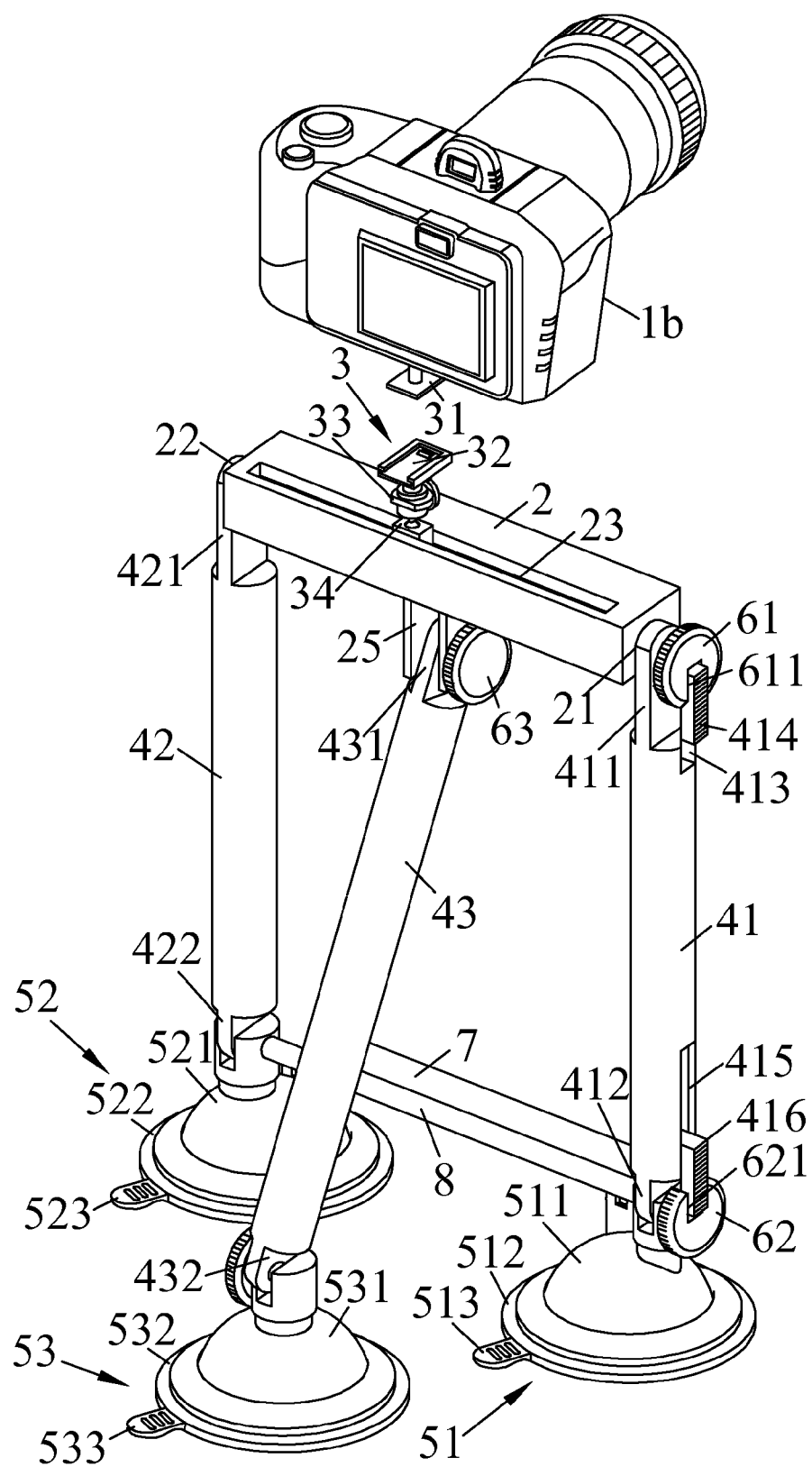
FIG. 5 is a perspective view of a suction-type mounting bracket device according to a second embodiment of the present invention.

Please refer to FIG. 5 that is a perspective view of a suction-type mounting bracket device according to a second embodiment of the present invention. The second embodiment is generally structurally similar to the first preferred embodiment, but further includes a third support post 43, a third suction cup 53, a bolt 63, and a third connecting section 25 provided on the crossbar 2. The third support post 43 has a first end 431 and a second end 432. The first end 431 of the third support post 43 is connected to the third connecting section 25. The third suction cup 53 includes a cup portion 531, a rubber flange portion 532, and a third pull tab 533. The cup portion 531 is located atop the rubber flange portion 532, the third pull tab 533 is located at and projected from a rim of the rubber flange portion 532, and the third suction cup 53 is connected to the second end 432 of the third support post 43.

As shown in FIG. 1, with a general supporting capacity of the first and the second support post 41, 42, the suction-type mounting bracket device according to the first preferred embodiment of the present invention having a portable electronic device mounted thereto may be stably attached to any smooth surfaces, such as a table top, a window, a refrigerator, a car roof, a chair, etc., simply by attaching the first and the second suction cup 51, 52 to the smooth surface through suction force. However, for a relatively large portable electronic device 1b, such as a video camera or a single lens camera, which is heavier than the supporting capacity of the first and the second support post 41, 42, the second embodiment shown in FIG. 5 is more suitable for use. At this point, the third support post 43 is additionally connected at the first end 431 to the third connecting section 25, and the bolt 63 is tightened to lock the first end 431 of the third support post 43 to the third connecting section 25 on the crossbar 2. Thereafter, the third suction cup 53 is tightly attached to the glass member (not shown in FIG. 5) through suction force. In this manner, the suction-type mounting bracket device of the present invention would have increased supporting capacity sufficient for stably supporting the relatively heavy portable electronic device 1b thereon, and the portable electronic device 1b is well protected against the risk of falling and any damage so caused.

The present invention has been described with some preferred embodiments thereof and it is understood that many changes and modifications in the described embodiments may be carried out without departing from the scope and the spirit of the invention that is intended to be limited only by the appended claims.

What is claimed is:

1. A suction-type mounting bracket device applicable to a portable electronic device, comprising:
   a crossbar comprising a plurality of connecting sections;
   an adjustable mount disposed on the crossbar for coupling to the portable electronic device;
   at least two support posts each comprising a first end and a second end, the support posts coupling at the first ends to the connecting sections of the crossbar, such that the crossbar is rotatable about the first end of one of the support posts; and
   at least two suction cups coupled to the second ends of the support posts respectively,
   wherein the adjustable mount includes a pivoted body and an inverted-T connector; the pivoted body is used for adjusting the portable electronic device to different angular positions, and the inverted-T connector is used for connecting the pivoted body to the crossbar.

2. The suction-type mounting bracket device as claimed in claim 1, wherein the crossbar comprises at least one slot, in which the inverted-T connector is slidably received, such that the adjustable mount is movable on the crossbar along the slot.

3. The suction-type mounting bracket device as claimed in claim 1, further comprising a plurality of stoppers for separately locking the crossbar to the support posts and the support posts to the suction cups.

4. The suction-type mounting bracket device as claimed in claim 3, wherein the stoppers are selected from the group consisting of bolts, rivets, and a combination thereof.

5. The suction-type mounting bracket device as claimed in claim 2, wherein each of the connecting sections comprises a recess, to which the first ends of the support posts are connected.

6. A suction-type mounting bracket device applicable to a portable electronic device, comprising:
   a crossbar comprising a plurality of connecting sections;
   an adjustable mount disposed on the crossbar for coupling to the portable electronic device;
   at least two support posts each comprising a first end and a second end, the support posts coupling at the first ends to the connecting sections of the crossbar, such that the crossbar is rotatable about the first end of one of the support posts;
   at least two suction cups coupled to the second ends of the support posts respectively; and
   at least one brace having two opposite ends respectively connected to the suction cups.

7. The suction-type mounting bracket device as claimed in claim 1, further comprising a control lever connected to the suction cups for controlling the suction cups to attach to or release from the smooth surface.

8. The suction-type mounting bracket device as claimed in claim 6, wherein the adjustable mount includes a pivoted body and an inverted-T connector; the pivoted body is used for adjusting the portable electronic device to different angular positions, and the inverted-T connector is used for connecting the pivoted body to the crossbar.

9. The suction-type mounting bracket device as claimed in claim 8, wherein the crossbar comprises at least one slot, in which the inverted-T connector is slidably received, such that the adjustable mount is movable on the crossbar along the slot.

10. The suction-type mounting bracket device as claimed in claim 9, wherein each of the connecting sections comprises a recess, to which the first ends of the support posts are connected.

11. The suction-type mounting bracket device as claimed in claim 6, further comprising a plurality of stoppers for separately locking the crossbar to the support posts and the support posts to the suction cups.

12. The suction-type mounting bracket device as claimed in claim 11, wherein the stoppers are selected from the group consisting of bolts, rivets, and a combination thereof.

13. The suction-type mounting bracket device as claimed in claim 6, further comprising a control lever connected to the suction cups for controlling the suction cups to attach to or release from the smooth surface.

* * * * *